(12) United States Patent
Lippmann et al.

(10) Patent No.: US 12,144,330 B2
(45) Date of Patent: Nov. 19, 2024

(54) SEINE NET ASSEMBLY HAVING BUOYANT SEINE NET PURSE RINGS AND METHOD OF SEINE FISHING USING SAME

(71) Applicant: Fluoron Inc., Elkton, MD (US)

(72) Inventors: Matthew Lippmann, Oak Park, IL (US); David O'Neill, Vashon, WA (US)

(73) Assignee: Fluoron, Inc., Elkton, MD (US)

( * ) Notice: Subject to any disclaimer, the term of this patent is extended or adjusted under 35 U.S.C. 154(b) by 72 days.

(21) Appl. No.: 17/744,562

(22) Filed: May 13, 2022

(65) Prior Publication Data
US 2023/0363365 A1    Nov. 16, 2023

(51) Int. Cl.
*A01K 73/12*   (2006.01)
*A01K 75/04*   (2006.01)
*A01K 75/06*   (2006.01)

(52) U.S. Cl.
CPC .............. *A01K 73/12* (2013.01); *A01K 75/04* (2013.01); *A01K 75/06* (2013.01)

(58) Field of Classification Search
CPC ........ A01K 73/12; A01K 75/00; A01K 75/04; A01K 75/06
USPC ............................................................ 43/14
See application file for complete search history.

(56) References Cited

U.S. PATENT DOCUMENTS

| | | | |
|---|---|---|---|
| 587,268 A * | 7/1897 | McFarland | A01K 73/12 43/14 |
| 1,108,417 A * | 8/1914 | Woodfield | A01K 73/12 43/14 |
| 3,729,756 A | 5/1973 | Watkins | |
| 3,789,532 A * | 2/1974 | Ferguson | A01K 73/12 43/14 |
| 4,006,549 A * | 2/1977 | Seabrooke | A01K 73/12 43/106 |
| 4,052,755 A | 10/1977 | Baker | |
| 4,053,755 A | 10/1977 | Baker | |
| 4,381,617 A * | 5/1983 | McSweeny, Jr. | A01K 75/00 43/14 |
| 4,894,873 A | 1/1990 | Eddy | |
| 5,231,820 A * | 8/1993 | Berger | D07B 1/20 57/1 R |
| 5,505,013 A * | 4/1996 | Gois | F16B 45/02 43/14 |

(Continued)

FOREIGN PATENT DOCUMENTS

JP          4-4827        *   1/1992

*Primary Examiner* — David J Parsley
(74) *Attorney, Agent, or Firm* — Invention To Patent Services; Alex Hobson

(57) ABSTRACT

A seine net assembly utilizes buoyant seine net purse rings that float above the leadline and therefore reduce the risk of the purse rings getting snagged on the bottom of the body of water. An exemplary buoyant purse ring may have a specific gravity less than 1.0 and preferably, between 0.08 and 0.96. It is desirable that the purse rings float but not be so buoyant that they cause the leadline and therefore the leadline end of the net to float. An exemplary purse ring is made out of a polymeric material such as polyethylene and most preferably ultra-high molecular weight polyethylene (UHMWPE). A polymeric purse ring may have a ring wall with a rectangular shape designed for durability and tighter packing. The width of the ring wall may be greater than the thickness.

20 Claims, 4 Drawing Sheets

(56) References Cited

U.S. PATENT DOCUMENTS

| | | |
|---|---|---|
| 6,270,387 B1 | 8/2001 | Nesheim |
| 8,141,228 B2 * | 3/2012 | Gois, Sr. ............... F16B 45/02 43/14 |
| 9,022,827 B2 | 5/2015 | Snyder, II |
| 9,267,535 B2 * | 2/2016 | Jang ..................... F16B 45/02 |
| 9,908,594 B2 | 3/2018 | Von Eberstein |
| 10,167,677 B2 | 1/2019 | Von Eberstein |
| 11,602,137 B2 * | 3/2023 | Seo ..................... A01K 75/00 |

\* cited by examiner

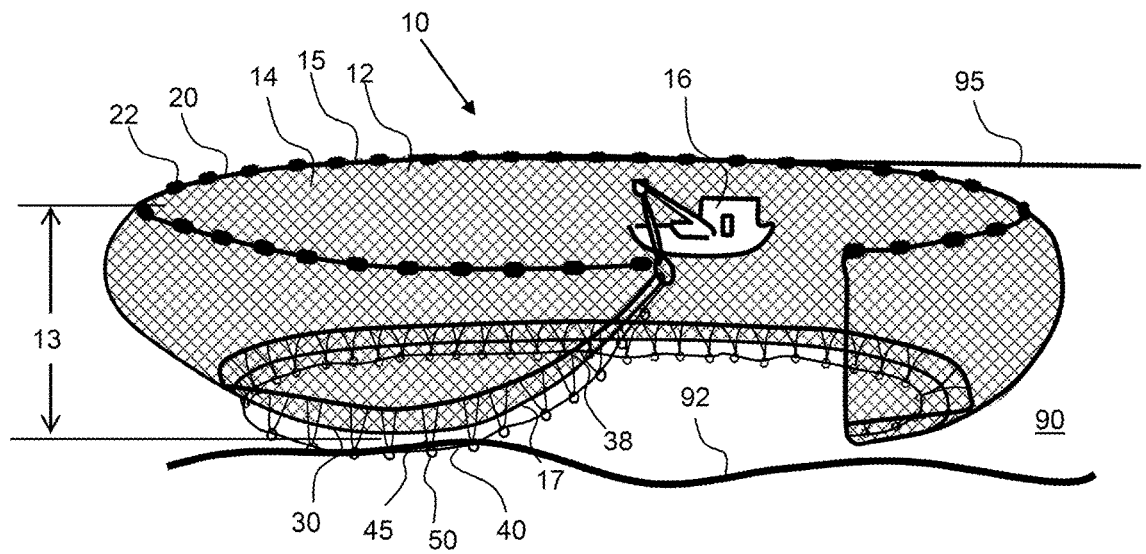
FIG. 3
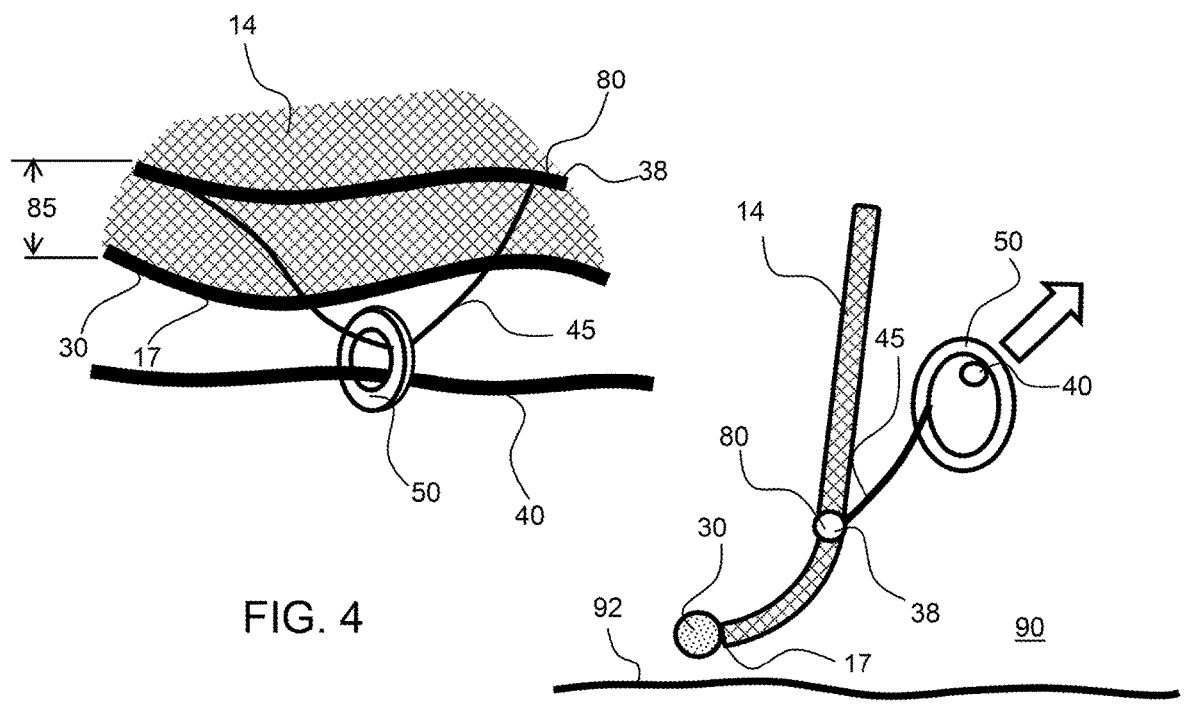
FIG. 4
FIG. 5

SEINE NET ASSEMBLY HAVING BUOYANT SEINE NET PURSE RINGS AND METHOD OF SEINE FISHING USING SAME

BACKGROUND OF THE INVENTION

Field of the Invention

The invention relates to a seine net assembly having buoyant seine net purse rings and a method of seine fishing using said seine net assembly.

Background

Seine net fishing is an effective way to catch a large number of fish. The net is released into the water by a boat and the seine net has a has a floatline end that floats due to a plurality of floats coupled to the floatline end of the net by a float line. The bottom of the net, or the leadline end of the net sinks due to the leadline, which has a specific gravity heavier than water. The leadline is typically made of metal. The leadline end of the net is cinched or drawn together by a purseline that extends through purse rings that are coupled to the net by bridles. The bridles extend from the purse rings to the leadline. The purse rings are typically made of metal and also sink.

Often times seine net fishing is done in water wherein the leadline end of the net touches the bottom of the body of water. In these situations, the purse rings drag along the bottom and can get snagged on rocks and other objects on the bottom. This can cause significant problems and prevent the fish encircled by the seine net from being brought onto the boat.

SUMMARY OF THE INVENTION

The invention is directed to a seine net assembly having buoyant seine net purse rings and a method of seine fishing using said seine net assembly. The seine net assembly utilizes buoyant purse rings that float above the leadline and therefore reduce the risk of the purse rings getting caught or snagged on the bottom of the body of water. An exemplary buoyant purse ring has a specific gravity less than 1.0 and preferably, between 0.08 and 0.96, or in some cases preferably between 0.9 and 0.96. It is desirable that the purse rings float but not be so buoyant that they cause the leadline end of the net of the seine net to float. It is important that the leadline sinks the leadline end of the net to a full depth of the seine net, to enable the seine net to form as large a wall or enclosure as possible in the water around fish. If the leadline end of the net does not sink to a full depth the capture area formed will be reduced and this in not desirable.

An exemplary leadline may be made out of metal, such as being a chain or metal wire including a wound or braided metal wire having a plurality of wire strands. A leadline may have a protective covering or sheath of the metal. A leadline may be a composite of a synthetic, such as a plastic mixed with metal, such as lead to produce a composite leadline with a specific gravity of greater than 1.0.

The purse rings are coupled to the seine net, proximal the leadline end of the seine net, such as to a coupling line, including a leadline or to a ribline. When the water is deep and there is no risk of the leadline end of the net contacting the floor of the body of water, the purse rings may preferably be coupled to the leadline. However, when the depth of the water is about the same or less than the depth of the seine net the purse rings may be coupled to a ribline, a separate line from the leadline that is configured an offset distance up from the leadline or from the leadline end of the seine net. This offset distance may be about 30 cm or more, about 50 cm or more about 1 m or more and any range between and including the offset distance values provided. The ribline may be a buoyant line and with the purse ring being buoyant, the purseline is retained above the leadline and the floor of the body of water to prevent snagging.

The purse rings are typically coupled to the leadline or ribline by a bridle, a tether that may extend through the purse ring and have each end coupled along the length of the leadline or ribline. The bridles vary in length depending on the length and type of seine net and may have a length from a first end to a second end of about 2 m or more, about 3 m or more, about 4 m or more and any range between and including the length values provided. Therefore, the purse rings are typically about 1.0 m to 2.0 m from the leadline end of the net or from the ribline. Bridles are usually made of synthetic material, such as a polymeric material with a specific gravity also less than 1. The bridles displace very little water and therefore would not be sufficient to keep a metal purse ring afloat above the leadline or ribline.

An exemplary purse ring is buoyant, as described herein, and may be made out of a polymeric material, such as a polyolefin, including polypropylene and polyethylene. Polypropylene, including copolymers of polypropylene, has a specific gravity of about 0.90 to 0.91. A preferred polymer is polyethylene having a specific gravity from about 0.917 to about 0.94, and most preferably ultra-high molecular weight polyethylene (UHMWPE), having a specific gravity from about 0.93 to 0.95. Ultra-high molecular weight polyethylene is preferred because it provides an extremely low coefficient of friction and is very tough and durable to withstand the rugged environment of seine net fishing.

Other polymer materials that may be suitable for the purse ring include, Acrylonitrile Butadiene Styrene (ABS) having a specific gravity of about 1.0. ABS may also be a suitable material for the bridles. ABS may be buoyant and therefore purse rings made of ABS may be buoyant. Other plastics that have a specific gravity of less than 1.0 include Ethylene Vinyl Acetate (EVA) with a specific gravity of 0.92 to 0.94. There are few plastics that have high durability, strength and also a specific gravity that is less than 1.0, and therefore buoyant.

A polymeric purse ring could also be made to have a shape that would provide improved durability and increase the strength to weight ratio. Typical metal purse rings are toroid shaped having a ring wall with a circular cross sectional shape. A rectangular cross sectional shape of the purse ring wall may provide a higher strength to weight ratio. The ring wall width may be greater than the ring wall thickness, such as by being at least 50% greater or more, about 100% greater or more, about 200% greater or more, about 300% greater or more and any range between and including the percentages provided. A purse ring with a thinner thickness would allow more purse rings to fit on a shackle, the ring hook, or ring bar, that often holds the rings once the purseline is pulled up to the side of the vessel. Also, a purse ring with a rectangular cross sectional shape may provide the same or higher break strength than a circular cross sectional shape and require less material. Therefore, a rectangular cross sectional shaped purse ring wall may provide a manufacturing cost savings.

A purse ring may have a shape wherein the ring wall width is a portion of the ring wall inner diameter, such as no more than bout 50% of the inner diameter, no more than 35% of the inner diameter, no more than about 25% or the inner diameter and at least 20% of the inner diameter and any range between and including the percentages provided.

In addition, a polymeric purse ring is lighter in weight than a metal purse ring which may help prevent injury when deploying and retracting the purse rings and the seine net. Table 1 shows a comparison of a metal purse ring to a purse ring made out of UHMWPE.

TABLE 1

|  | Metal | Polymeric |
| --- | --- | --- |
| Material | 316SS | UHMW-PE |
| Dimensions ID/OD/THK (in) | 6.0/6.625/0.625 | 6.0/9.5/0.625 |
| (cm) | 15.2/16.8/15.8 | 15.2/24.1/15.8 |
| Weight (lbs)/(kg) | 1.7/0.771 | 0.9/0.408 |
| Bouyancy (lbs)/(kg) | −1.5/−0.680 | 0.1/0.045 |

As shown in table 1, the polymeric purse rings can vary in width and thickness depending on the type of net being used, a common size could have a width of 1.75 inches (44.45 mm) which makes them very durable. The ring wall width, or diameter of an equivalent common metal purse ring is only 0.625 inches (15.875 mm). Also, the metal ring has a weight of 1.7 lbs whereas the polymeric purse ring has a weight of only 0.9 lbs. The polymeric purse ring is made of UHMWPE and has a positive buoyance of 0.1 and therefore floats. A negative buoyance will cause the purse ring to sink.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 3 shows a seine net system including a seine net assembly that is released into the water and then retracted by a boat by the purseline that extends through the purse rings that are coupled to a ribline by bridles.

FIG. 4 shows a purseline and purse ring portion of a seine net with the purse ring coupled to a ribline by the bridles, wherein the ribline is coupled to the seine net an offset distance up from the leadline.

FIG. 5 shows a side view of a seine net with a purse ring coupled to the ribline by a bridle.

Figure 1:
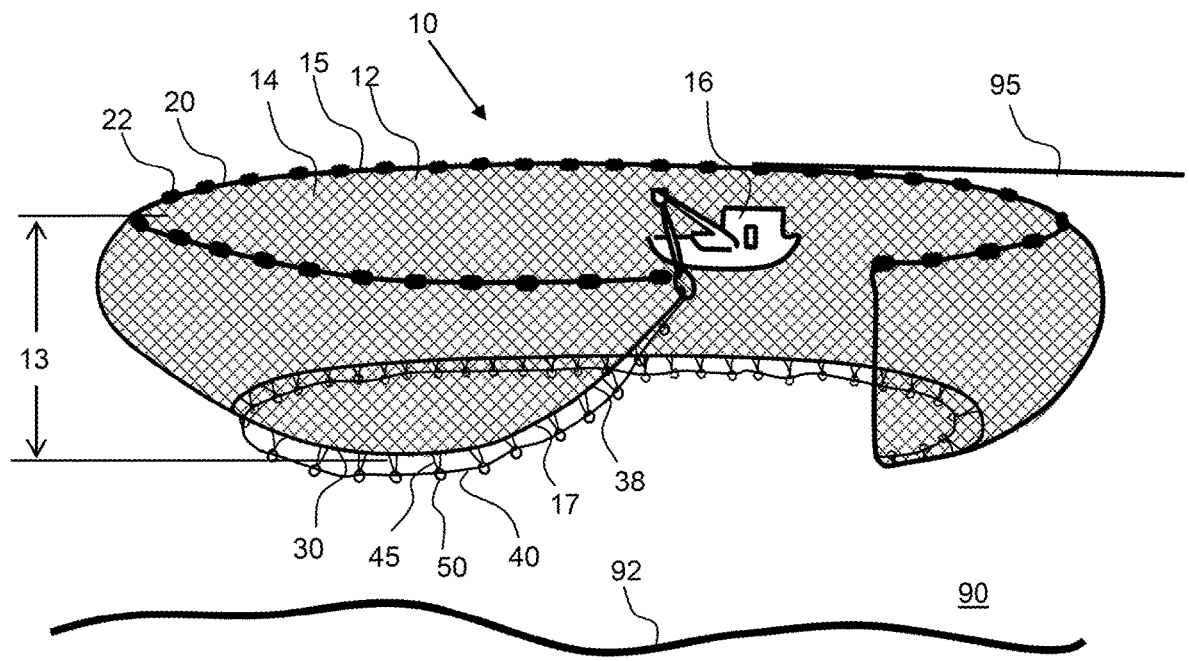
FIG. 1 shows a seine net system including a seine net assembly that is released into the water and then retracted by a boat by the purseline that extends through the purse rings that are coupled to a leadline by bridles.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
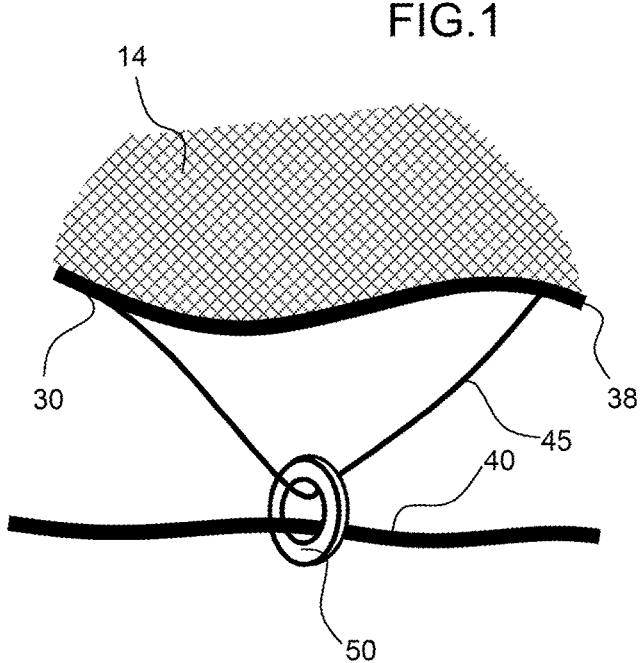
FIG. 2 shows a purseline and purse ring portion of a seine net.

Referring to FIGS. 1 and 2, an exemplary seine net system 10 includes a seine net assembly 12 that is released into the water and then retracted by a boat 16. The floatline end 15 of the seine net 14 is floated on or proximal to the surface 95 of the water by floats 22 coupled to a floatline 20. The bottom or leadline end 17 of the seine net 14 is sunk into the water by a leadline 30 that sinks and pulls the seine net down through the water. A purseline 40 extends through purse rings 50 and is coupled to a coupling line 38, a leadline in this embodiment, by a bridle 45. The purseline is then retracted onto the boat and cinches closed to capture fish within the seine net. This type of purse ring 50 coupling to the leadline 30 may be used when the depth 13 of the seine net 14 from the floatline end 15 to the leadline end 17 is less than the depth of the body of water 90 and there is no risk of the leadline end 17 of the seine net contacting the floor 92 of the body of water.

Referring now to FIGS. 3 to 5, an exemplary seine net system 10 includes a seine net assembly 12 that is released into the water and then retracted by a boat 16 by the purseline 40. The purse rings are coupled to a coupling line 38, a ribline 80 in this embodiment, that is configured an offset distance 85 up from the leadline 30. This type of attachment of the purse rings is used when the seine net is used in shallower waters where there is a risk that the leadline 30 and leadline end 17 of the seine net 14 will contact the floor 92 of the body of water 90. The ribline is preferably a buoyant line having a specific gravity of less than 1.0 and therefore the ribline pulls the seine net up from the leadline. Also, with the purse ring being buoyant, the purseline is retained up from the floor 92 of the body or water 90. Note that the purseline may also be a buoyant purseline that may be made out of a material, such as a polymeric material having a specific gravity less than 1.0 and preferably, between 0.08 and 0.96, or between 0.9 and 0.96.

As best shown in FIG. 5, the ribline 80 is coupled to the seine net 14 an offset distance up from the leadline end 17 of the net, or from the leadline 30, coupled to the leadline end of the net. The bridle 45 extends from the ribline to the purse ring 50 and the purseline 40 extends through the purse ring. The large arrow indicates the purseline being pulled to retract the sein net 14 to the boat.

FIG. 4 shows a purseline 40 and purse ring portion of a seine net with the purse ring 50 coupled to a ribline 80 by the bridles 45. The ribline is coupled to the seine net 14 an offset distance 85 from the leadline end 17 of the seine net, or from the leadline.

Figure 6:
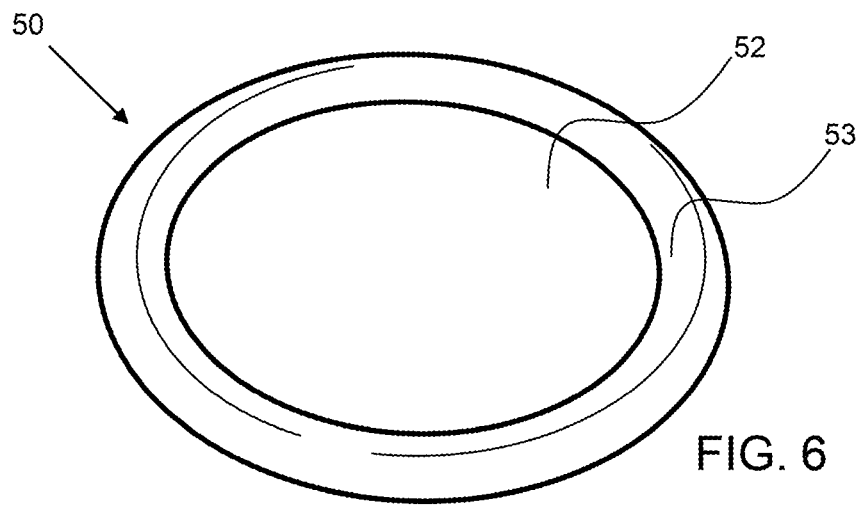
FIG. 6 shows a perspective view of an exemplary purse ring having a circular cross-section.
Figure 7:
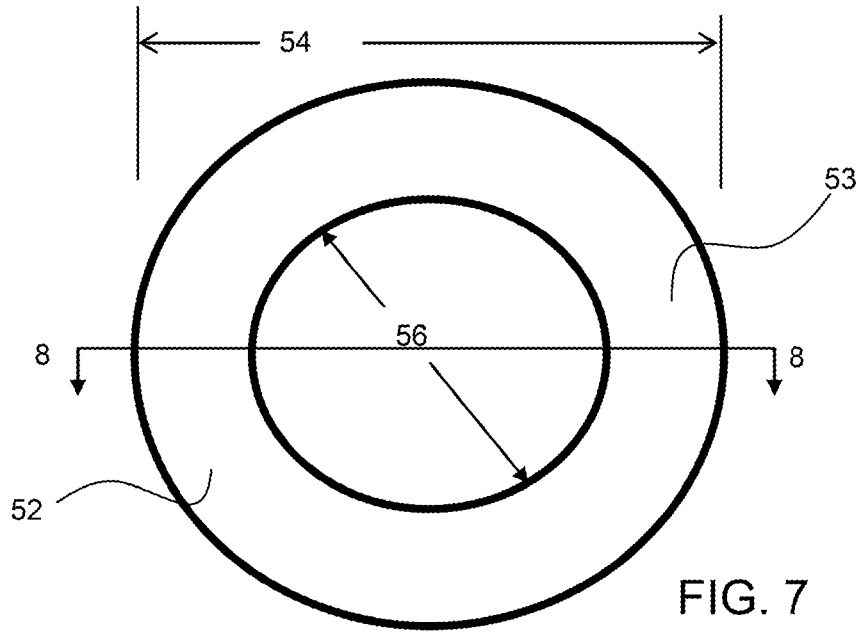
FIG. 7 shows a top view of the exemplary purse ring shown in FIG. 6.
Figure 8:
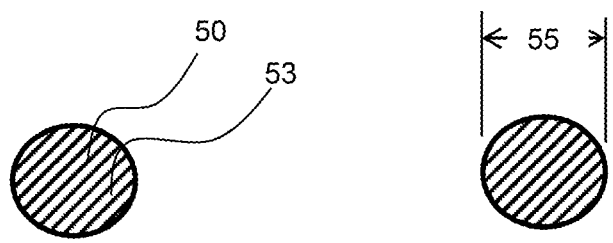
FIG. 8 shows a cross sectional view of the purse ring shown in FIG. 7 along line 8-8.

Referring now to FIGS. 6 to 8, an exemplary purse ring 50 is a toroid having a ring wall 53 with a circular cross section, as shown in FIG. 8. The purse ring has a center aperture 52 and a ring wall diameter 55 defined by the difference in the outer diameter 54 and inner diameter 56.

Figure 9:
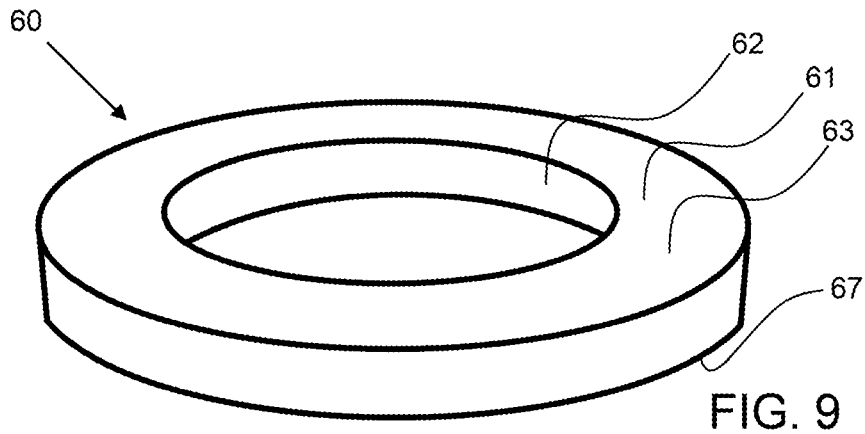
FIG. 9 shows a perspective view of an exemplary purse ring having a rectangular cross-section.
Figure 10:
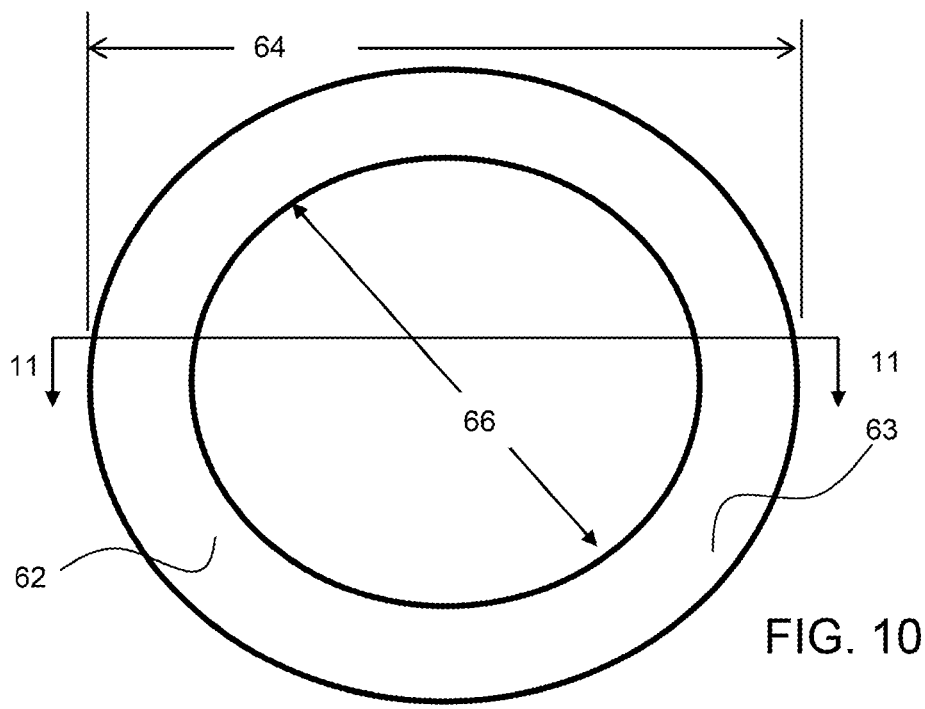
FIG. 10 shows a top view of the exemplary purse ring shown in FIG. 9.
Figure 11:
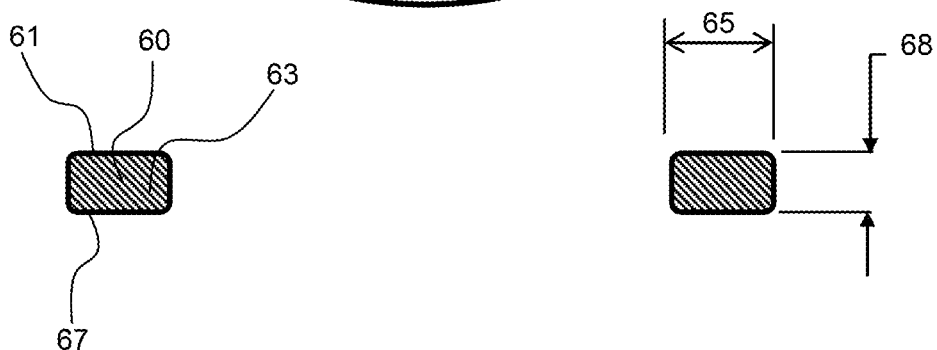
FIG. 11 shows a cross sectional view of the purse ring shown in FIG. 10 along line 11-11.

Referring now to FIGS. 9 to 11, an exemplary purse ring 60 is a disc shape having a ring wall 63 with a rectangular cross section, as shown in FIG. 11. The purse ring has a center aperture 62 and a ring wall width 65 defined by the difference in the outer diameter 64 and inner diameter 66. The purse ring has a thickness 68 from the first face 61 to the second face 67, which are planar faces, as shown. The first fac0 type of geometry of the purse ring may enable a higher strength to weight of material ratio and this may reduce the cost of the purse rings.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of purse seine net fishing comprising:
    a) providing a seine net system comprising:
        i) a seine net extending from a floatline end to a leadline end;
        ii) a float line;
        iii) a plurality of floats coupled to the float line;
        wherein the float line is configured to float the floatline end of the seine net in a body of water;
        iv) a leadline having a specific gravity greater than 1.5 and configured to sink the leadline end of the net in water;
        wherein said net extends between the float line and the leadline;
        v) a plurality of purse rings, each coupled to the net by a bridle and each having a ring wall extending around a purse ring aperture;
        vi) a purseline extending through the purse ring aperture of the plurality of purse rings; and
            wherein each of the plurality of purse rings are buoyant in water and has a specific gravity of between 0.90 to 0.96;
        wherein the leadline sinks the leadline end of the net below the plurality of purse rings and wherein the plurality of purse rings are not so buoyant that they cause the leadline end of the net to float;
    b) placing the seine net system in the water with the purseline coupled to a marine vessel;
    c) allowing the leadline end of the seine net to sink in said body of water, wherein the plurality of floats retain the float line proximal to a surface of said body of water;
    d) extending the seine net to form an enclosure;
    e) cinching the leadline end of the net by pulling the purseline through the purse rings, wherein the purseline is extended up above the leadline by the plurality of purse rings; and
    f) retracting the seine net to the marine vessel.

2. The method of seine net fishing of claim 1, wherein each of the plurality of purse rings is made of a polymeric material.

3. The method of seine net fishing of claim 1, wherein each of the plurality of purse rings is made of ultra-high-molecular weight polyethylene (UHMWPE).

4. The method of seine net fishing of claim 1, wherein each of the plurality of purse rings consists of ultra-high-molecular weight polyethylene (UHMWPE).

5. The method of seine net fishing of claim 1, wherein each of the plurality of purse rings further has an outer diameter and an inner diameter, wherein the rope aperture is circular in shape.

6. The method of seine net fishing of claim 1, wherein each of the plurality of purse rings has an inner diameter of the purse ring aperture, and wherein the ring wall has a width that is at least 20% and no more than 50% of the inner diameter.

7. The method of seine net fishing of claim 6, wherein the ring wall has a circular cross section.

8. The method of seine net fishing of claim 1, wherein each of the plurality of purse rings is disc shaped.

9. The method of seine net fishing of claim 8, wherein the ring wall has a rectangular cross section.

10. The method of seine net fishing of claim 9, wherein the ring wall has a width that is greater than the ring wall thickness.

11. The method of seine net fishing of claim 10, wherein the ring wall width is at least 50% greater than the ring wall thickness.

12. The method of seine net fishing of claim 11, wherein each of the plurality of purse rings is made of ultra-high-molecular weight polyethylene (UHMWPE).

13. The method of seine net fishing of claim 1, wherein the bridle is coupled to the leadline.

14. The method of seine net fishing of claim 1, wherein the seine net system further comprises a ribline and wherein the bridle is coupled to said ribline, and wherein the ribline is coupled to the net an offset distance from the leadline.

15. The method of seine net fishing of claim 14, wherein the offset distance is at least 30 cm.

16. The method of seine net fishing of claim 14, wherein ribline is buoyant having a specific gravity of less than 1.0.

17. The method of seine net fishing of claim 14, wherein ribline is made of ultra-high-molecular weight polyethylene (UHMWPE).

18. The method of seine net fishing of claim 1, wherein the purseline is buoyant having a specific gravity of between 0.90 to 0.96.

19. The method of seine net fishing of claim 18, wherein the purseline is made of ultra-high-molecular weight polyethylene (UHMWPE).

20. The method of seine net fishing of claim 19, wherein the seine net system further comprises a ribline and wherein the bridle is coupled to said ribline, and wherein the ribline is coupled to the net an offset distance from the leadline, and wherein the ribline is made of ultra-high-molecular weight polyethylene (UHMWPE).

* * * * *